United States Patent [19]

Watatani

[11] 4,110,761
[45] Aug. 29, 1978

[54] COLOR SIGNAL PROCESSING APPARATUS FOR VIDEO SIGNAL RECORDING AND REPRODUCING SYSTEM

[75] Inventor: Yoshizumi Watatani, Machida, Japan
[73] Assignee: Hitachi, Ltd., Japan
[21] Appl. No.: 748,906
[22] Filed: Dec. 9, 1976

[30] Foreign Application Priority Data

Dec. 12, 1975 [JP] Japan .................................. 50-147337
Dec. 12, 1975 [JP] Japan .................................. 50-147338
Dec. 12, 1975 [JP] Japan .................................. 50-147340

[51] Int. Cl.² ............................................. H04N 5/76
[52] U.S. Cl. ...................................................... 358/4
[58] Field of Search ...................... 358/4.8; 360/18, 19, 360/20, 24, 29, 33, 34

[56] References Cited
U.S. PATENT DOCUMENTS

| 3,918,085 | 11/1975 | Numakura et al. ...................... 358/4 |
| 4,007,482 | 2/1977 | Amari ................................. 358/4 |
| 4,007,484 | 2/1977 | Amari ............................... 358/4 X |

Primary Examiner—Robert L. Richardson
Assistant Examiner—Aristotelis M. Psitos
Attorney, Agent, or Firm—Craig & Antonelli

[57] ABSTRACT

An apparatus for recording a color television signal on a recording medium by converting a carrier color signal in the color television signal to a low frequency band signal and reproducing the color television signal by converting the recorded low frequency band carrier color signal to the original high frequency carrier color signal is disclosed. The apparatus comprises a voltage controlled oscillator having a center frequency of which is equal to a frequency which differs from a carrier wave frequency of a color signal in a standard color television signal by a carrier wave frequency of a low frequency carrier color signal, and including a crystal resonator, a frequency converter circuit for mixing an output of the voltage controlled oscillator with the low frequency carrier color signal to reproduce a carrier color signal having an original carrier frequency, and means for phase comparing a color burst signal of the reproduced carrier color signal with an output signal of a fixed frequency oscillator having an output frequency which is equal to the carrier wave frequency of the color signal of the standard color television signal to control the voltage controlled oscillator in accordance with a voltage corresponding to a phase difference. A quality factor Q of the crystal resonator of the voltage controlled oscillator is damped to a value lower than a normal value.

6 Claims, 8 Drawing Figures

F I G. 2
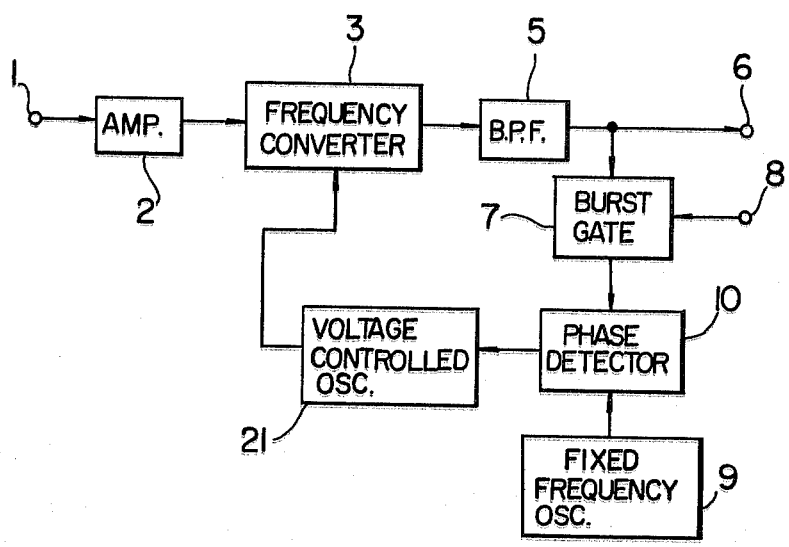

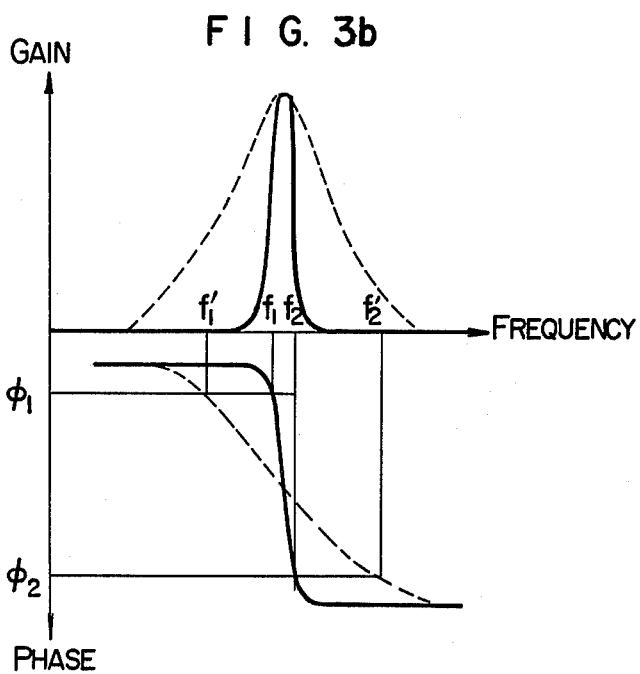
FIG. 3b
FIG. 3a
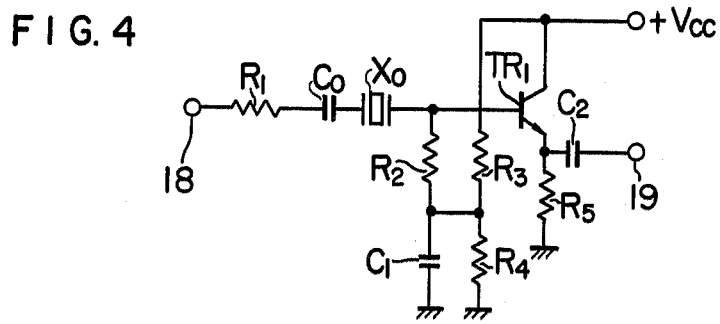
FIG. 4
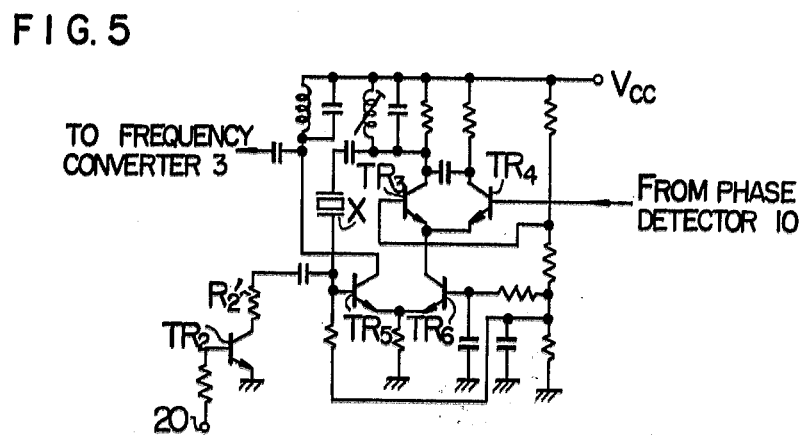
FIG. 5

F I G. 6
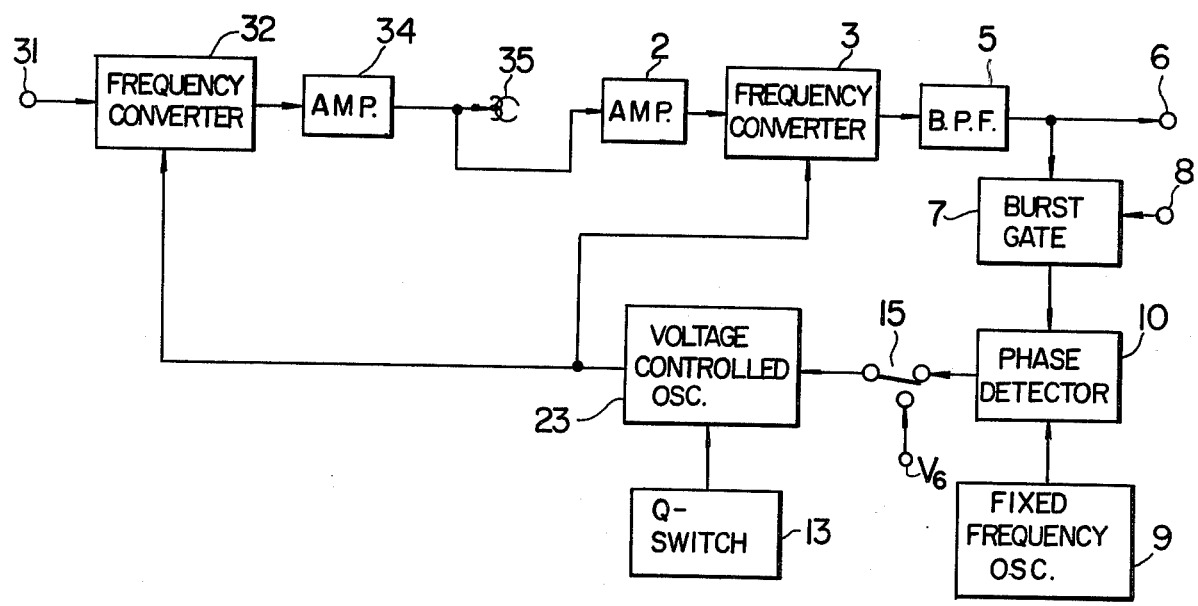
F I G. 7
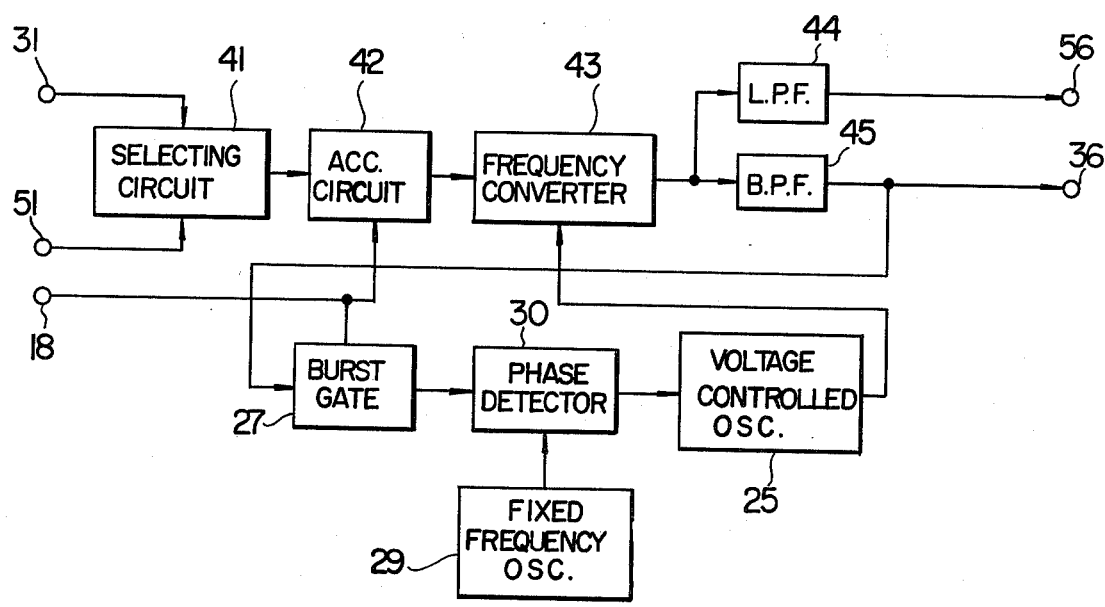

COLOR SIGNAL PROCESSING APPARATUS FOR VIDEO SIGNAL RECORDING AND REPRODUCING SYSTEM

BACKGROUND OF THE INVENTION

1. Field of the Invention

The present invention relates to a color signal processing apparatus in a video signal recording and reproducing system such as a video tape recorder.

2. Description of the Prior Art

Heretofore, in recording a color television signal, it has been frequently practiced to record a carrier color (chrominance) signal of the color television signal by frequency converting or frequency shifting the same. For example, in a home video tape recorder, the carrier color signal in the color television signal was mixed with an output signal from a local oscillator in a frequency converter comprised of a balanced demodulator or the like for the frequency conversion to a low frequency band signal, which was recorded on a magnetic tape with a luminance signal.

When the carrier color signal which had been frequency converted to the low frequency band signal was to be reproduced, a color signal processing apparatus as shown in FIG. 1 was used. FIG. 1 is a block diagram which shows only that portion which processes the carrier color signal of the video tape recorder with a luminance signal processing circuit, a color demodulation circuit and succeeding circuit being omitted. A signal read by a magnetic head, not shown, is applied to a separation circuit, also not shown, for separating a low frequency carrier color signal from the luminance signal. The separated low frequency carrier color signal is applied to an input terminal 1 and then amplified by an amplifier 2 as required. The amplified low frequency carrier color signal from the amplifier 2 is supplied to a frequency converter 3, to which a signal for frequency conversion generated in a manner to be described later is also applied through a band pass filter 4. The frequency converter 3 thus converts the low frequency carrier color signal to a high frequency band signal which is equivalent to a standard color televison signal. The frequency converter 3 includes a non-linear circuit such as a multiplier circuit comprised of a balanced modulator or a differential amplifier, as is well known in the art. The carrier color signal which has been converted to the high frequency band signal by the frequency converter 3 is then applied to a band pass filter 5 where spurious frequency components are eliminated, thence to an output terminal 6. Other processes such as demodulation or the like may be carried out as required. The signal for the frequency conversion to be supplied to the frequency converter 3 is generated in the following manner. The high frequency carrier color signal from the band pass filter 5 is applied to a burst gate 7, which gates a color burst signal during a horizontal retrace period under the control of a horizontal synchronizing signal supplied from a synchronizing signal input terminal 8. A fixed frequency oscillator 9 oscillates at a frequency ($f_C$) which is approximately equal to that of a carrier wave of the carrier color signal which has been converted to the high frequency band signal. The oscillation output from the oscillator 9 and the color burst signal from the burst gate 7 are applied to a phase detector 10, which produces a voltage corresponding to a phase difference between those two signals. The output voltage of the phase detector 10 controls an oscillation frequency of a voltage controlled oscillator 11 which has a center frequency which is equal to a carrier frequency ($f_{LC}$) of the carrier color signal which has been converted to the low frequency band signal during recording. The oscillation frequency of the voltage controlled oscillator 11 changes in accordance with the output voltage of the phase detector 10. The output of the voltage controlled oscillator 11 and the output of the fixed frequency oscillator 9 are applied to the frequency converter 12 where they are mixed together to produce a frequency component equal to a sum of both frequencies ($f_C + f_{LC}$) through the band pass filter 4. The sum frequency ($f_C + f_{LC}$) signal is used as a frequency conversion signal for the carrier color signal. A loop including the phase detector 10 and the voltage controlled oscillator 11 constitutes an automatic phase control (APC) loop, which has been known to reduce a time base variation included in the reproduced color signal.

In the APC loop shown in FIG. 1, however, since the color burst signal is repetitively inserted at a horizontal scan frequency (i.e. at approximately 15,734 KHz hereinafter abbreviated as $f_H$, in the NTSC system) as is well known in the art, the width of variation of the oscillation frequency of the voltage controlled oscillator 11 must be limited within $\pm f_H/2$ around the frequency $f_{LC}$. This is because the color burst signal is not a continuous signal as described above but has side band components at the interval of the frequency $f_H$ so that if the width of variation of the frequency is too wide the phase lock will occur not only at a normal carrier wave frequency but also at a frequency which is an integral multiple of the frequency $f_H$.

For this reason it has been difficult to mass produce an oscillator which has a narrow frequency variation width with a circuit including conventional L - C components.

Furthermore, the apparatus of FIG. 1 had a drawback of complexity in the circuit configuration in that two frequency converters were required and the filter for passing the frequency conversion signal was required.

SUMMARY OF THE INVENTION

It is an object of the present invention to provide a carrier color signal processing apparatus which significantly simplifies the circuit configuration and which is highly stable in operation.

It is another object of the present invention to provide a color signal processing apparatus which incorporates an oscillator which has a better frequency stability than a prior art oscillator.

It is a further object of the present invention to provide a color signal processing apparatus which is simple in the circuit configuration and which is suitable for use in a color video signal recording and reproducing apparatus.

According to one feature of the present invention, the center frequency of the voltage controlled oscillator included in the automatic phase control loop is selected to be the sum frequency of the carrier frequency of the carrier color signal converted to the low frequency band and the carrier frequency of the high frequency carrier color signal. The voltage controlled oscillator includes a crystal resonator a quality factor Q of which is damped to a value lower than a normal value.

According to the above feature of the present invention, the range of frequency pulling of the automatic phase control (APC) loop can be widened while improving the temperature dependency of the frequency stability over that of a prior art circuit configuration. Furthermore, portions of the frequency converters and the filter may be eliminated. The present invention may also be applicable where a common oscillator is used to frequency convert the carrier color signal during recording and to frequency convert the carrier color signal during reproduction.

BRIEF DESCRIPTION OF THE DRAWINGS

FIG. 2 is a block diagram showing one embodiment of the present invention.

FIG. 3a shows an equivalent circuit diagram of a crystal resonator.

FIG. 3b shows an amplitude-frequency characteristic and a phase-frequency characteristic of the crystal resonator near a resonance frequency thereof.

FIG. 4 shows a circuit diagram for illustrating an example of circuit for damping Q of the crystal resonator.

FIG. 5 is a circuit diagram showing an example of a voltage controlled oscillator using the crystal resonator.

FIGS. 6 and 7 are block diagrams illustrating other embodiments of the present invention.

DESCRIPTION OF THE PREFERRED EMBODIMENTS

Figure 1:
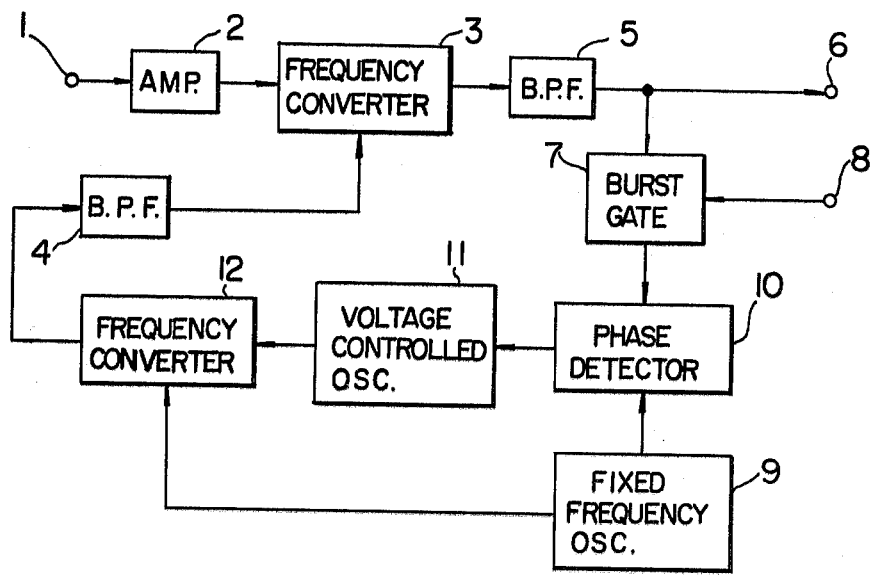
FIG. 1 is a block diagram showing a prior art circuit arrangement for reading and processing a recorded carrier color signal.

FIG. 2 shows a block diagram of a carrier color signal reproducing circuit in accordance with one embodiment of the present invention. Again, in the block diagram of FIG. 2, only a processing circuit for the carrier color (chrominance) signal in a video signal read from a recording medium is shown in order to simplify the explanation.

Applied to an input terminal 1 is the carrier color signal derived from a separation circuit for separating the carrier color signal from a luminance signal of a composite video signal read from the recording medium such as a magnetic tape by a known magnetic head not shown. The low frequency carrier color signal read from the recording medium is amplified by an amplifier 2 and supplied to a frequency converter 3, to which an oscillation signal output from a voltage controlled oscillator 21 is applied to convert or shift a carrier frequency of the carrier color signal to an original high frequency. The high frequency carrier color signal is then fed to a band pass filter 5 to produce an output at an output terminal 6. Unlike the prior art voltage controlled oscillator shown in FIG. 1, the voltage controlled oscillator 21 uses a crystal resonator a center frequency of which is equal to a sum frequency $(f_C + f_{LC})$ of the carrier frequency $f_C$ of the high frequency carrier color signal and the carrier frequency $f_{LC}$ of the low frequency carrier color signal.

A color burst signal is extracted by a burst gate 7 from the high frequency carrier color signal derived from the output of the band pass filter 5. Like the prior art burst gate shown in FIG. 1, the burst gate 7 gates the color burst signal under the control of a horizontal synchronizing signal applied to an input terminal 8. The horizontal synchronizing signal may be derived from the luminance signal of the signal read from the recording medium by a known synchronous separation circuit. The color burst signal derived from the burst gate 7 is applied to a phase detector 10 like in the prior art circuit shown in FIG. 1 to detect a phase difference from an output signal of a fixed frequency oscillator 9 which oscillates at the carrier wave frequency $f_C$ of the high frequency carrier color signal. An output from the phase detector 10 is applied to the voltage controlled oscillator 21 to form an automatic phase control (APC) loop.

As described above, the voltage controlled oscillator 21 include the crystal resonator. In the past, when the crystal resonator was used, it was used in a high Q condition which is an inherent characteristic of the crystal resonator. For this reason, when it was used in the voltage controlled oscillator a range of frequency control was narrow and hence it was considered not practical to use the crystal resonator in the oscillator the output frequency of which was controlled. However, it has been found that if the crystal resonator which has a Q in the order of 5,000 to 10,000 as a single element is used in Q-damped condition around 1,000, the range of frequency control can be widened to ± 5 – 6 KHz for the sum frequency $f_C + f_{LC}$ of around 4.3 MHz. Yet, the temperature stability of the oscillation frequency can be maintained at substantially the same as that of a normal crystal resonator.

Means for damping the Q of the crystal resonator is now described. FIG. 3a shows an equivalent circuit of an electrical circuit of the crystal resonator and FIG. 3b shows an amplitude-frequency characteristic and a phase-frequency characteristic of the crystal resonator near a resonance frequency thereof. As shown in FIG. 3a, a Q of a resonance circuit including the crystal resonator is governed by a series resistance of the circuit as seen from input and output terminals because an internal resistance $\gamma$ of the crystal resonator is very small. Accordingly, a high Q can be obtained by rendering an input-output impedance of the crystal resonator low, and a low Q can be obtained by rendering the input-output impedance of the crystal resonator high. It is also possible to obtain a larger value of $\gamma$ by changing a structure of the crystal resonator per se. When the Q is lowered, the amplitude and phase characteristics change as shown by broken lines in FIG. 3b. As seen from FIG. 3b, for a given phase difference of $\phi_1 - \phi_2$, the frequency difference is expanded from $f_1 - f_2$ to $f_1' - f_2'$. Accordingly, in an oscillator in which an oscillation frequency varies in accordance with an amount of phase shift, a range of frequency for permitting the oscillation can be expanded by lowering the Q of the crystal resonator. In this manner, by operating the crystal resonator in a Q-damped condition, the range of frequency pulling of the APC loop can be expanded while maintaining the temperature stability of the frequency substantially unchanged.

FIG. 4 shows one embodiment of a circuit for damping the Q by an external circuit of the crystal resonator. Numeral 18 denotes a signal input terminal and numeral 19 denotes a signal output terminal.

The Q of the resonance circuit including the crystal resonator is substantially determined by a sum of an input terminal impedance $R_1$ as seen from the crystal resonator $X_o$ and an output terminal impedance $R_2$ and it is given by $$Q = \frac{2\pi f_o L}{R_1 + R_2 + \gamma},$$

where $f_o$ is a center frequency of the crystal resonator $X_o$. Generally, since an insertion loss increases as the impedance $R_1$ increases, it is preferable to damp the Q by increasing the impedance $R_2$. Thus, by selecting the impedance $R_2$ of a sufficiently, high value, the voltage controlled oscillator which use the crystal resonator having the center frequency of $f_C + f_{LC}$ to be used in the color signal reproducing circuit of the present invention can be provided. A transistor $TR_1$ constitutes a buffer amplifier.

FIG. 5 shows a specific embodiment of an oscillation circuit to be used in the present invention. The oscillation circuit includes a differential amplifier and uses a resistor $R_2'$ as a means for damping the Q. A transistor $TR_2$ is connected in series to the resistor $R_2'$. The transistor $TR_2$ is rendered conductive by supplying a positive bias voltage to a terminal 20 so that the Q of a crystal resonator X is damped. When the transistor $TR_2$ is rendered nonconductive by removing the bias voltage applied to the terminal 20, the resistor $R_2'$ is disconnected so that the Q of the crystal resonator X is maintained at a normal high value.

In this manner, by the use of the voltage controlled oscillator 21 having the center frequency of $f_C + f_{LC}$ and including the Q-damped crystal resonator, the frequency converter 12 and the band pass filter 4 shown in FIG. 1 can be eliminated and the circuit configuration may be simplified.

FIG. 6 is a block diagram illustrating another embodiment of the present invention. In the present embodiment, a local oscillation signal for the frequency shifting of the carrier color signal is derived from a common oscillator for both recording and reproducing. A carrier color signal to be recorded is applied to an input terminal 31. The carrier color signal is shifted to a low frequency signal by a frequency converter 32, amplified by a recording amplifier 34 and fed to a magnetic head 35. While the magnetic head 35 is usually supplied with a mixed signal of the carrier color signal and a luminance signal which has been frequency modulated for recording, luminance signal processing circuits such as a luminance signal modulation circuit and a mixing circuit are omitted from the description and the drawing because they are not directly related to the subject of the present invention. In reproducing, the signal read from a magnetic head 35 is divided into the luminance signal and the carrier chrominance signal. Again, a separation circuit is omitted herein.

The circuit configuration of the reproducing circuit for the carrier chrominance signal is similar to that shown in FIG. 2 except the addition of a switch 16 for selecting a control voltage and a Q switching circuit 13 for selecting the Q of the crystal resonator. The Q switching circuit 13 functions to connect or disconnect a resistor to or from the crystal resonator of the voltage controlled oscillator 23, and it comprises, for example, the resistor $R_2'$ and the transistor $TR_2$ shown in FIG. 5 and a bias applying means, not shown. The Q switching is carried out in linked relation to the operation of the switch 15 for the control voltage. Namely, during the recording mode, the switch 15 is switched so that a constant voltage $V_6$ which is independent of the output voltage of the phase detector 10 is applied to the voltage controlled oscillator 23 to allow free oscillation thereof while the Q switching circuit 13 is conditioned to operate the crystal resonator at a high Q condition to enhance the frequency stability thereof. In this manner, the voltage controlled oscillator 23 oscillates stably at the frequency $f_C + f_{LC}$ which is supplied to the frequency converter 32 to produce the stable low frequency carrier chrominance signal. During the reproduction mode, the switch 15 is switched so that the output voltage of the phase detector 10 is applied to the voltage controlled oscillator 23 while the Q switching circuit 13 is conditioned to operate the crystal resonator at a low Q condition. In this manner, the circuit is operated in the manner as in the embodiment shown in FIG. 2 producing the stable reproduced carrier chrominance signal output.

Instead of applying the constant voltage $V_6$ by the switch 15, the circuit may be arranged such that the phase detector 10 is connected to or disconnected from the voltage controlled oscillator 23. Alternatively, the oscillation of the fixed frequency oscillator 9 may be selectively stopped or the output of the burst gate 7 may be selectively disconnected to obtain the similar effect.

Thus, according to the circuit configuration of FIG. 6, no separate local oscillator for recording need be provided so that the recording and reproducing circuit can be further simplified.

FIG. 7 is a block diagram illustrating a further embodiment of the present invention. In the present embodiment, a common oscillator for frequency shifting the carrier chrominance signal is used for recording and reproducing, and at the same time a common circuit is used for an automatic color control (ACC) circuit and the frequency converter. A carrier color signal of a video signal to be recorded is applied to an input terminal 31 while a carrier chrominance signal of the video signal read from a recording medium is applied to an input terminal 51. A selection circuit 41 passes the signal applied to the input terminal 31 during the recording mode which it passes the signal applied to the input terminal 51 during the recording. The ACC circuit 42 is similar to a conventional ACC circuit of a standard color television receiver and it maintains the amplitude of the carrier chrominance signal at a constant magnitude based on the amplitude of the color burst signal. The carrier chrominance signal taken out of the ACC circuit 42 is frequency shifted in a frequency converter 43 using an output signal from a voltage controlled oscillator 25. During the recording mode, the color signal having its carrier frequency shifted to a low frequency passes through a low pass filter 44 to an output terminal 56, thence it is supplied to a processing circuit, not shown, for recording. During the reproduction mode, the color signal having its carrier wave reconverted to a high frequency is passed through a band pass filter 45 to an output terminal 36, thence it is supplied to a processing circuit, not shown, for demodulation.

The voltage controlled oscillator has a center frequency which is equal to a sum frequency $(f_C + f_{LC})$ of the carrier wave frequency $f_C$ of the high frequency carrier chrominance signal and the carrier wave frequency $f_{LC}$ of the low frequency carrier chrominance signal, and includes a crystal resonator the Q of which can be selectively damped. Numeral 27 denotes a burst gate which is isolated from the video signal to be recorded during the recording mode and isolated from the video signal read from the recording medium during the reproduction mode to extract a color burst signal from the carrier chrominance signal under the control of a horizontal synchronizing signal supplied at a synchronizing signal input terminal 18. The phase detector 30 detects a phase difference between an output of a fixed frequency oscillator 29 which oscillates at the frequency $f_C$ which is equal to the carrier wave frequency of the high frequency carrier chrominance signal and an output of the burst gate 27, and an output voltage indicative of the phase difference is applied to the voltage controlled oscillator 25.

During the recording mode, the voltage controlled oscillator 25 is conditioned to freely oscillate so that it produces an output of a fixed frequency. To this end, the oscillation of the fixed frequency oscillator 29 may be stopped or the operation of either the burst gate 27 or the phase detector 30 may be stopped. Alternatively, like the embodiment previously shown, the control voltage to be applied to the voltage controlled oscillator 25 may be changed to a fixed voltage. In this case, the Q of the crystal resonator is to be changed to a high value as in the case of the previous embodiment.

During the reproduction mode, the frequency converted carrier chrominance signal is phase controlled by the APC loop including the frequency converter 43, the band pass filter 45, the burst gate 27, the fixed frequency oscillator 29, the phase detector 30 and the voltage controlled oscillator 25 so that the carrier chrominance signal is maintained at the same frequency as the oscillation frequency of the fixed frequency oscillator 29 irrespective of the time base variation in the course of recording and reproducing processes. In this case, since the Q of the crystal resonator of the voltage controlled oscillator 25 is damped as in the case of the previous embodiment, the range of frequency control may be widened so that the oscillator can fully follow the frequency variation of the reproduced carrier chrominance signal. In this manner a color video signal recording and reproducing apparatus with a stable color signal reproduction ability is provided.

It should be understood that a similar effect may be obtained in the embodiment shown in FIG. 7 when the arrangement of the ACC circuit 42 and the frequency converter 43 is inverted so that the output of the selection circuit 41 is applied to the frequency converter 43 and the output of the frequency converter 43 is applied to the input of the ACC circuit 42, and the output of the ACC circuit 42 is applied to the input of the low pass filter 44 and the input of the band pass filter 45.

What is claimed is:

1. A recording and reproducing apparatus for recording a color television signal on a recording medium after having frequency shifted a carrier color signal of a color video signal to a low frequency band signal and reproducing the color television signal by frequency shifting the low frequency band carrier color signal read from the recording medium to an original high frequency band signal, comprising:

voltage controlled oscillator means having a center frequency which is equal to a frequency which differs from a carrier wave frequency of the carrier color signal of said color television signal by a carrier wave frequency of the carrier color signal which has been frequency shifted to said low frequency band signal, and including a resonance circuit with a crystal resonator and means for damping a quality factor Q of said resonance circuit;

fixed frequency oscillator means for oscillating at a frequency which is equal to the carrier wave frequency of the carrier color signal of said color television signal;

frequency shifting means for mixing the low frequency band carrier color signal read from said recording medium with an output of said voltage controlled oscillator to produce the carrier color signal having the carrier wave frequency of the unshifted carrier color signal; and means for detecting a phase difference between a color burst signal of the carrier color signal derived from said frequency shifting means and an output of said fixed frequency oscillator to control an oscillation frequency of said voltage controlled oscillator in accordance with the detected phase difference.

2. A recording and reproducing apparatus for recording a color television signal on a recording medium after having frequency shifted a carrier color signal of the color video signal to a low frequency band signal and reproducing the color television signal by frequency shifting the low frequency band carrier color signal read from the recording medium to an original high frequency band signal, comprising:

voltage controlled oscillator means having a center frequency which is equal to a frequency which differs from a carrier wave frequency of the carrier color signal of said color television signal by a carrier wave frequency of the carrier color signal which has been frequency shifted to said low frequency band signal, and including a resonance circuit with a crystal resonator;

fixed frequency oscillator means for oscillating at a frequency which is equal to the carrier wave frequency of the carrier color signal of said color television signal;

first frequency shifting means for mixing the carrier color signal of the color television signal to be recorded with an output of said voltage controlled oscillator to produce the carrier color signal of the low frequency band;

second frequency shifting means for mixing the low frequency carrier color signal band carrier color signal with the output of said voltage controlled oscillator to produce the carrier color signal having the carrier wave frequency of the unshifted carrier color signal;

means for detecting a phase difference between a color burst signal of the carrier color signal derived from said second frequency shifting means and an output of said fixed frequency oscillator to control an oscillation frequency of said voltage controlled oscillator in accordance with the detected phase difference; and means for disabling the function of the frequency control of said voltage controlled oscillator while recording said color television signal on said recording medium to cause the voltage controlled oscillator to oscillate at a constant frequency.

3. A recording and reproducing apparatus according to claim 2, wherein said voltage controlled oscillator includes a means for damping a quality factor Q of a resonance circuit including said crystal resonator when the recorded signal is being read from said recording medium.

4. A recording and reproducing apparatus for recording a color television signal on a recording medium after having frequency converted a carrier color signal of a color video signal to a low frequency band signal and reproducing the color television signal by frequency converting the low frequency band carrier color signal read from the recording medium to an original high frequency band signal, comprising:

selecting means for selectively supplying the carrier color signal to be recorded and the carrier color signal read from the recording medium;

voltage controlled oscillator means having a center frequency which is equal to a frequency which differs from a carrier wave frequency of the carrier color signal of said color television signal by a carrier wave frequency of the carrier color signal which has been frequency converted to said low frequency band signal, and including a resonance circuit with a crystal resonator;

frequency converting means for mixing an output of said selecting means with an output of said voltage controlled oscillator to frequency convert the supplied carrier color signal;

fixed frequency oscillator means for oscillating at a frequency which is equal to the carrier wave frequency of the carrier color signal of said color television signal;

means for detecting a phase difference between a color burst signal of the carrier color signal derived from said frequency converting means and an output of said fixed frequency oscillator while said switching means is being conditioned to supply the carrier color signal read from said recording medium to control an oscillation frequency of said voltage controlled oscillator in accordance with the detected phase difference;

first filter means for applying the output of said frequency converting means as the low frequency color carrier signal to be recorded while said selecting means is supplying said high frequency carrier color signal to be recorded; and second filter means for applying the output of said frequency converting means as the high frequency color carrier signal for reproduction while said selecting means is supplying said carrier color signal read from the recording medium.

5. A recording and reproducing apparatus according to claim 4 further comprising means for causing said voltage controlled oscillator means to oscillate at a constant frequency when said selecting means is being conditioned to supply the carrier color signal to be recorded.

6. A recording and reproducing apparatus according to claim 4, wherein said voltage-controlled oscillator means includes means for damping a quality factor Q of said resonance circuit with said crystal resonator.

* * * * *